US010670761B2

(12) United States Patent
Wang et al.

(10) Patent No.: US 10,670,761 B2
(45) Date of Patent: Jun. 2, 2020

(54) QUASI-STATIC STONELEY SLOWNESS ESTIMATION

(71) Applicant: Halliburton Energy Services, Inc., Houston, TX (US)

(72) Inventors: Ruijia Wang, Singapore (SG); Chung Chang, Houston, TX (US); Baichun Sun, Perth (AU)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/753,927

(22) PCT Filed: Dec. 27, 2016

(86) PCT No.: PCT/US2016/068745
§ 371 (c)(1),
(2) Date: Feb. 20, 2018

(87) PCT Pub. No.: WO2018/125058
PCT Pub. Date: Jul. 5, 2018

(65) Prior Publication Data
US 2019/0317238 A1 Oct. 17, 2019

(51) Int. Cl.
*G01V 1/50* (2006.01)

(52) U.S. Cl.
CPC ........ *G01V 1/50* (2013.01); *G01V 2210/1299* (2013.01); *G01V 2210/1429* (2013.01);
(Continued)

(58) Field of Classification Search
None
See application file for complete search history.

(56) References Cited

U.S. PATENT DOCUMENTS

| 6,714,480 B2 | 3/2004 | Sinha et al. |
| 6,920,082 B2 | 7/2005 | Tang et al. |

(Continued)

FOREIGN PATENT DOCUMENTS

| WO | 2014092687 | 6/2014 | |
| WO | 2016187239 | 11/2016 | |
| WO | WO 2018/125058 | * 7/2018 | ............... G01V 1/48 |

OTHER PUBLICATIONS

X. M. Tang (Estimating Formation Permeability and Anistoropy From Borehole Stoneley Waves, 1 pages, SPWLA 45th Annual Logging Symposium, Jun. 6-9, 2004) (Year: 2004).*

(Continued)

*Primary Examiner* — Tung S Lau
(74) *Attorney, Agent, or Firm* — Benjamin Fite; C. Tumey Law Group PLLC

(57) ABSTRACT

A method and system for producing a Quasi-Static Stoneley Slowness log. The method for producing a Quasi-Static Stoneley Slowness log may comprise recording a pressure wave at a receiver; determining a slowness-frequency range with an information handling system from the pressure wave, processing a frequency-domain semblance, extracting a Stoneley Dispersion, minimizing a misfit between theoretical and the Stoneley Dispersion, and identifying Quasi-Static Stoneley slowness from the Stoneley Dispersion. The well measurement system for producing an Quasi-Static Stoneley Slowness log and shear slowness anisotropy may comprise a downhole tool, a vehicle, and an information handling system. Wherein the information handling system may be operable to record a pressure wave at a receiver, determine a slowness-frequency range with an information handling system from the pressure wave, process a frequency-domain semblance, extract a Stoneley Dispersion; minimize a misfit between theoretical and the Stoneley Dispersion; and identify Quasi-Static Stoneley slowness from the Stoneley Dispersion.

19 Claims, 7 Drawing Sheets

(52) U.S. Cl.
CPC ...... *G01V 2210/47* (2013.01); *G01V 2210/48* (2013.01); *G01V 2210/614* (2013.01); *G01V 2210/626* (2013.01); *G01V 2210/6222* (2013.01); *G01V 2210/6242* (2013.01); *G01V 2210/74* (2013.01)

(56) References Cited

U.S. PATENT DOCUMENTS

| | | | |
|---|---|---|---|
| 9,546,548 B2 * | 1/2017 | Hartog | E21B 47/101 |
| 9,757,770 B2 | 9/2017 | Chung et al. | |
| 2004/0001389 A1 | 1/2004 | Tang | |
| 2006/0120217 A1 | 6/2006 | Wu et al. | |
| 2007/0268782 A1 * | 11/2007 | Pabon | G01V 1/50 367/31 |
| 2008/0175099 A1 * | 7/2008 | Hawthorn | G01V 1/50 367/25 |
| 2011/0030467 A1 * | 2/2011 | Bakulin | E21B 47/101 73/152.32 |
| 2011/0058451 A1 | 3/2011 | Yoneshima | |
| 2011/0134719 A1 | 6/2011 | Kinoshita et al. | |
| 2014/0160890 A1 | 6/2014 | Fang et al. | |
| 2014/0236357 A1 * | 8/2014 | Degrange | E21B 47/124 700/275 |
| 2015/0049585 A1 | 2/2015 | Collins et al. | |
| 2016/0288167 A1 | 10/2016 | Jin et al. | |
| 2017/0023691 A1 * | 1/2017 | Donald | G01V 1/50 |
| 2017/0212274 A1 | 7/2017 | Sun et al. | |

OTHER PUBLICATIONS

Said Assous (Dispersive Mode Processing of Borehole Acoustic Logs Using Fast Slowness-Frequency inversion, 8 pages, 2018) (Year: 2018).*

"Inversion of Shear Wave Anisotropic Parameters in Strongly Anisotropic Formations[R]." by Chi et al. Massachusetts Institute of Technology. Earth Resources Laboratory, 2006.

"Determining formation shear-wave transverse isotropy from borehole Stoneley-wave measurements[J]." by Tang X. Geophysics, 2003, 68(1): 118-126.

"Stoneley-wave speed modeling in general anisotropic formations[J]." by Chi et al. Geophysics, 2006, 71(4): F67-F77.

"Sonic logging in deviated boreholes penetrating an anisotropic formation: Laboratory study[J]." by Zhu et al. Geophysics, 2007, 72(4): E125-E134.

International Search Report and Written Opinion for application No. PCT/US2016/068745 dated Sep. 26, 2017.

* cited by examiner

QUASI-STATIC STONELEY SLOWNESS ESTIMATION

BACKGROUND

For oil and gas exploration and production, a network of wells, installations and other conduits may be established by connecting sections of metal pipe together. For example, a well installation may be completed, in part, by lowering multiple sections of metal pipe (i.e., a casing string) into a borehole, and cementing the casing string in place. In some well installations, multiple casing strings are employed (e.g., a concentric multi-string arrangement) to allow for different operations related to well completion, production, or enhanced oil recovery (EOR) options.

The development of underground formations such as hydrocarbon reservoirs may be an ongoing process. In particular, analyzing well logs may allow an operator to evaluate, as a function of depth, quantitative properties representative of formations. By estimating quasi-static Stoneley wave slowness from monopole waveforms with minimal human intervention, a real time acoustic well log of Stoneley slowness versus depth may be produced. The Stoneley slowness could be further adopted in estimating formation shear slowness, formation anisotropy, or formation permeability, combining results from dipole data. This may provide an operator with a picture of the hydrocarbon reservoir in a formation.

BRIEF DESCRIPTION OF THE DRAWINGS

These drawings illustrate certain aspects of some examples of the present disclosure, and should not be used to limit or define the disclosure.

DETAILED DESCRIPTION

This disclosure may generally relate to well logging. More particularly, in some examples, methods may be provided for determining a near real time acoustic well log by estimating the quasi-static Stoneley slowness from low-frequency monopole waveforms, which may be used to calculate shear slowness, shear anisotropy or formation permeability combining other logs, and further to calculated shear modules, Young's modulus and Poison's ratio with formation P slowness. These elastic modulus and Poisson's ratio may be parameters used for characterizing the mechanical properties of a rock formation. They may be implemented to estimate borehole characteristics that may comprise stability, sanding potential, fracture strength, and a number of other related parameters, which may determine a procedure for well completion and production. The mechanical properties may be functions of the compressional (P) and shear (S) acoustic wave velocities and rock density. Without limitation, production companies want to make reservoir development decisions, providing accurate acoustic well logs as a function of reservoir depth in real and/or near real time on-site at the well with minimal human intervention may be desirable Acoustic logging tools may fire acoustic sources with different azimuthal symmetries to measure acoustic velocities. In fast isotropic formations, the P and S wave velocities may be estimated from refracted P and S acoustic waves excited by an axi-symmetric (monopole) source. These waves may be non-dispersive and may allow for direct estimation of the wave velocities (or slownesses) using a variety of time or frequency semblance techniques. Two guided wave modes may exist, the pseudo-Rayleigh mode and the Stoneley mode. Among them, borehole Stoneley mode may be essential in acoustic data interpretation as it provides multiple crucial applications for geoscientists and petroleum engineers. Specifically, Stoneley mode may be the only wave mode that is sensitive to formation elastic modulus $C_{66}$ in a Vertical Transversely Isotropic (VTI) well, which may be depicted by degree of the difference between the horizontal propagating shear wave slowness ($s_{SH}$) and the vertical propagating shear wave slowness ($s_{SV}$), where $s_{SH}$ could be estimated from quasi-static Stoneley wave slowness and $s_{SV}$ might be estimated using low-frequency dipole data.

Figure 1:
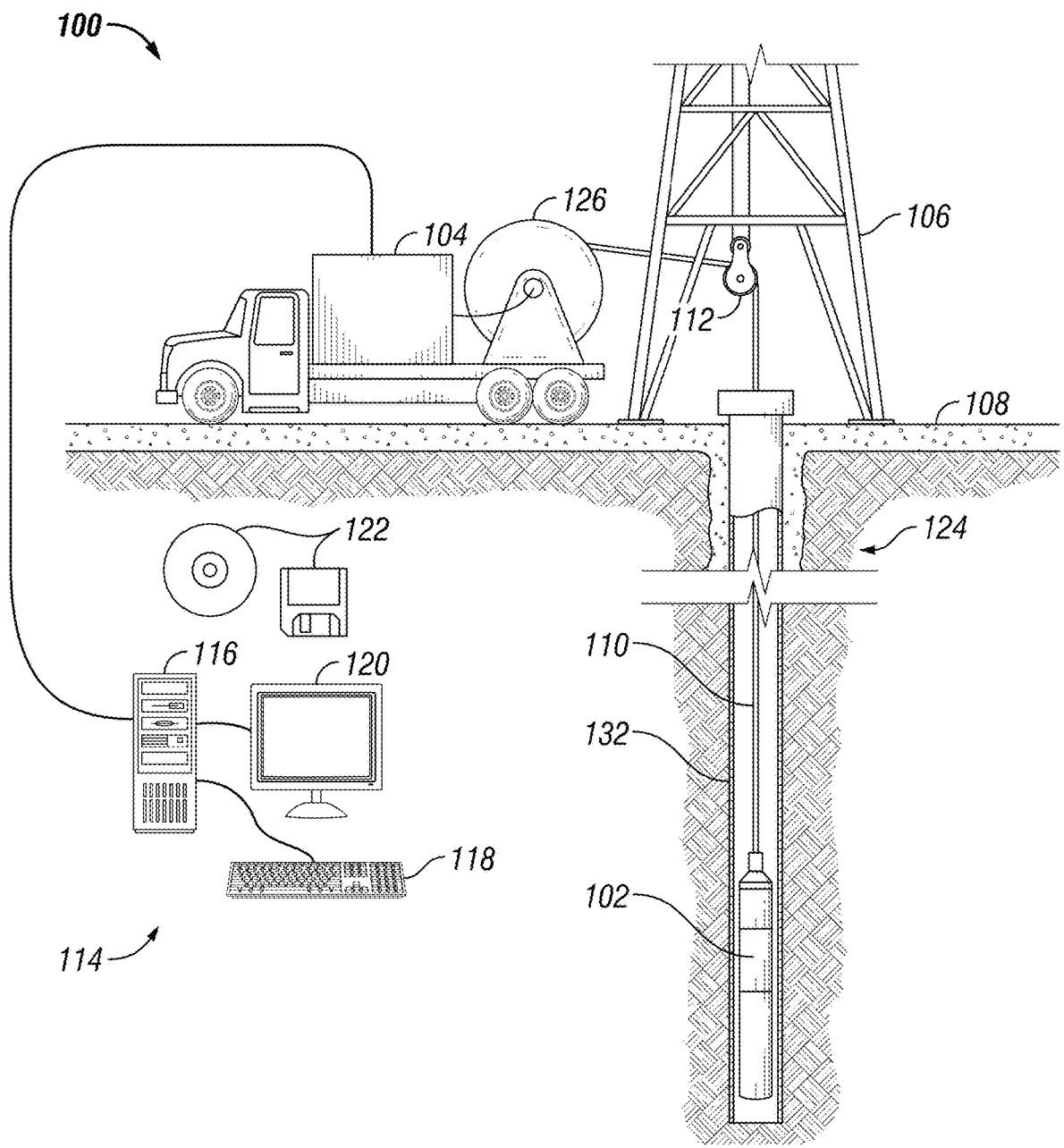
FIG. 1 is a schematic illustration of a well measurement system.

FIG. 1 illustrates a cross-sectional view of a well measurement system 100. As illustrated, well measurement system 100 may comprise downhole tool 102 attached a vehicle 104. In examples, it should be noted that downhole tool 102 may not be attached to a vehicle 104. Downhole tool 102 may be supported by rig 106 at surface 108. Downhole tool 102 may be tethered to vehicle 104 through conveyance 110. Conveyance 110 may be disposed around one or more sheave wheels 112 to vehicle 104. Conveyance 110 may include any suitable means for providing mechanical conveyance for downhole tool 102, including, but not limited to, wireline, slickline, coiled tubing, pipe, drill pipe, downhole tractor, or the like. In some embodiments, conveyance 110 may provide mechanical suspension, as well as electrical connectivity, for downhole tool 102. Conveyance 110 may comprise, in some instances, a plurality of electrical conductors extending from vehicle 104. Conveyance 110 may comprise an inner core of seven electrical conductors covered by an insulating wrap. An inner and outer steel armor sheath may be wrapped in a helix in opposite directions around the conductors. The electrical conductors may be used for communicating power and telemetry between vehicle 104 and downhole tool 102. Information from downhole tool 102 may be gathered and/or processed by information handling system 114. For example, signals recorded by downhole tool 102 may be stored on memory and then processed by downhole tool 102. The processing may be performed real-time during data acquisition or after recovery of downhole tool 102. Processing may alternatively occur downhole or may occur both downhole and at surface. In some embodiments, signals recorded by downhole tool 102 may be conducted to information handling system 114 by way of conveyance 110. Information handling system 114 may process the signals, and the information contained therein may be displayed for an operator to observe and stored for future processing and reference. Information handling system 114 may also contain an apparatus for supplying control signals and power to downhole tool 102.

Systems and methods of the present disclosure may be implemented, at least in part, with information handling system 114. Information handling system 114 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business. scientific, control, or other purposes. For example, an information handling system 114 may be a personal computer 116, a network storage device, or any other suitable device and may vary in size, shape, performance, functionality, and price. Information handling system 114 may include random access memory (RAM), one or more processing resources such as a central processing unit (CPU) or hardware or software control logic, ROM, and/or other types of nonvolatile memory. Additional components of the information handling system 114 may include one or more disk drives, one or more network ports for communication with external devices as well as various input and output (I/O) devices, such as a keyboard 118, a mouse, and a video display 120. Information handling system 114 may also include one or more buses operable to transmit communications between the various hardware components.

Alternatively, systems and methods of the present disclosure may be implemented, at least in part, with non-transitory computer-readable media 122. Non-transitory computer-readable media 122 may include any instrumentality or aggregation of instrumentalities that may retain data and/or instructions for a period of time. Non-transitory computer-readable media 122 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

In examples, rig 106 includes a load cell (not shown) which may determine the amount of pull on conveyance 110 at the surface of borehole 124. Information handling system 114 may comprise a safety valve which controls the hydraulic pressure that drives drum 126 on vehicle 104 which may reels up and/or release conveyance 110 which may move downhole tool 102 up and/or down borehole 124. The safety valve may be adjusted to a pressure such that drum 126 may only impart a small amount of tension to conveyance 110 over and above the tension necessary to retrieve conveyance 110 and/or downhole tool 102 from borehole 124. The safety valve is typically set a few hundred pounds above the amount of desired safe pull on conveyance 110 such that once that limit is exceeded; further pull on the conveyance 110 is prevented.

Figure 2:
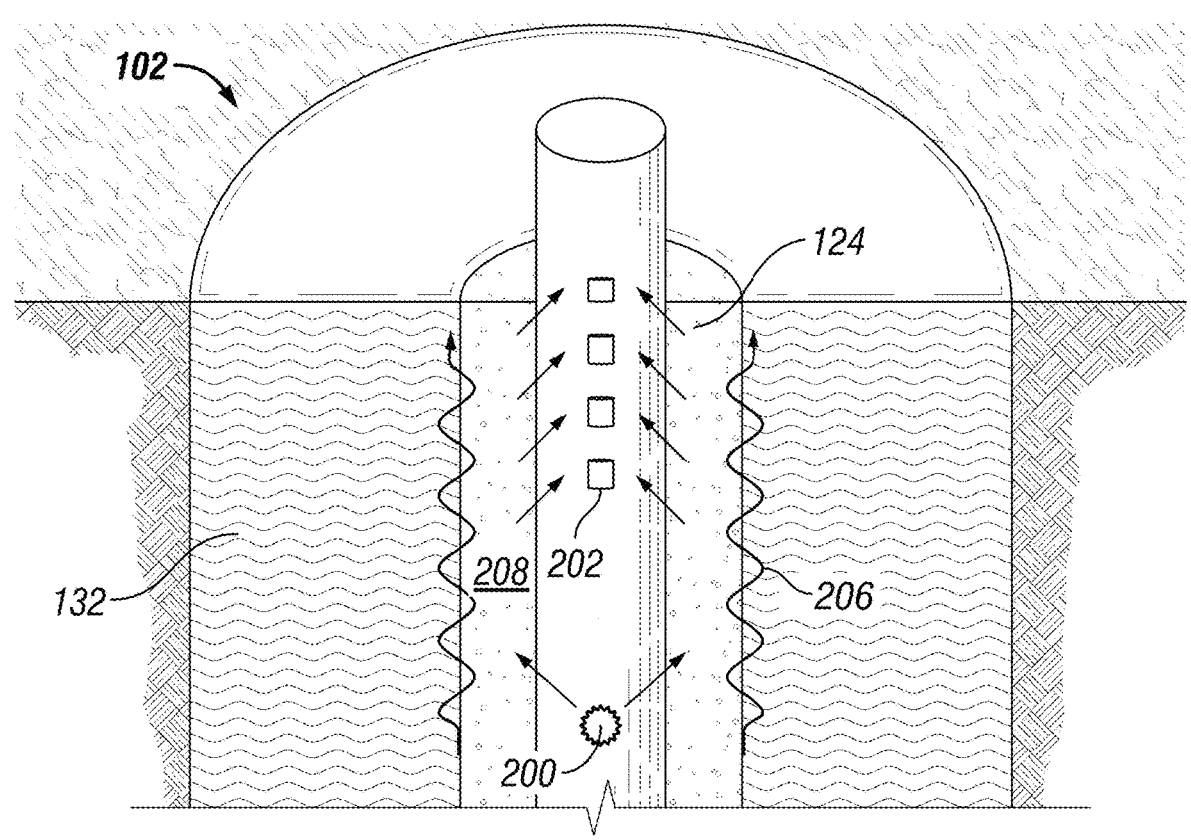
FIG. 2 is a schematic illustration of downhole tool.

FIG. 2 illustrates downhole tool 102, specifically an acoustic diploe configuration. It should be noted that downhole tool 102 may comprise any configuration suitable operation described within this disclosure. As illustrated, downhole tool 102 may be disposed within borehole 124 along a vertical axis. In examples, downhole tool 102 may comprise a monopole transmitter 200. Without limitation, monopole transmitter 200 may be disposed along any surface of downhole tool 102 and may be oriented in any direction. Additionally, there may be any number of monopole transmitters 200 disposed in any pattern and/or location along downhole tool 102. Downhole tool 102 may further comprise receiver 202. Without limitation, receiver 202 may be disposed along any surface of downhole tool 102 and may be oriented in any direction. It should be noted that receiver 202 may be monopole, dipole, and/or the like. Additionally, there may be any number of receivers 202 disposed in any pattern and/or location along downhole tool 102. In examples, receivers 202 may be disposed in an array aligned along the same azimuth of downhole tool 102. In examples, monopole transmitter 200 may generate an azimuthally asymmetric acoustic pressure wave (not illustrated) that may propagate through drilling fluid within borehole 124. The acoustic pressure field may be converted to shear (not illustrated) at borehole wall 132 and excite the flexural mode (not illustrated) in formation 134. The flexural mode may propagate down borehole 124, convert back into a pressure wave at borehole wall 132, and may impinge on receivers 202. The pressure exerted on each receiver 202 may be recorded by information handling system 114. Within borehole 124, Stoneley waves may be a dominant wave for acoustic data processing as it may provide various valuable information to geoscientist and petrophysicist. Low-frequency Stoneley waves, which may also be known as Tube waves, may be the only wave motion sensitive to the modulus of horizontal propagating shear waves. Methods of processing may extract shear wave slowness from the low-frequency Stoneley waves.

In examples, Stoneley waves may be excited by monopole transmitter 200, which may be an axis-symmetric acoustic source. Thus, the pressure distribution of Stoneley waves inside and outside of borehole 124 may be axis-symmetric. FIG. 2 illustrates downhole tool 2 which may generate and receive Stoneley waves in a fluid-filled borehole 124 which may be surrounded by a solid formation 206. Monopole transmitter 200 may produce acoustic signals into fluid 208 with borehole 124, which may hit borehole wall 132 and generate Stoneley waves. Receivers 202 may be located equally along the axis of borehole 124 to detect the pressure field of waves within borehole 124, which may be sent to information handling system 114 for further processing, analysis, and/or the like. Receivers 202 may be disposed in any order, with any spacing, and may be at any angle in relation to each other. The acoustic energy of Stoneley waves may be distributed both in the fluid 208 of borehole 124 and/or in formation 206 and may carry abundant information of the fluid 208 in borehole 124 and formation 206.

High-frequency Stoneley slowness may approach the Scholte wave slowness, while its zero-frequency (quasi-static) slowness may be a fixed value, which may be mathematical described in the equation below:

$$s_{ST} = \sqrt{\frac{\rho_{mud}}{K^*}} \quad (1)$$

where $\rho_{mud}$ is the mass density of the borehole fluid, (e.g., fluid 208 of FIG. 2) and $K^*$ is the effective bulk modulus, which is given by, $$\frac{1}{K^*} = \frac{1}{K_{mud}} + \frac{1}{\mu_{fm}}, \quad (2)$$

for an opened borehole 124 without the presence of downhole tool 102, where $\mu_{fm}$ denotes effective formation shear modulus. Specifically, $\mu_{fm}$ refers to the elastic modulus $C_{66}$ for a VTI, Vertically Transversely Isotropic, formation in borehole 124. Taking into consideration downhole tool 102, the equation may be defined as below:

$$\frac{1}{K^*} = \frac{1}{K_{mud}} + \frac{1}{1-r_{tool}} \left( \frac{1}{\mu_{fm}} + \frac{r_{tool}}{\mu_{tool}} \right), \quad (3)$$

where $r_{tool}$ is the volume fraction of downhole tool 102 relative to borehole 124, $\mu_{tool}$ is the effective tool modulus. In examples, Equations (1) and (2) may not describe formation 206 and all variations formation 206 may comprise. For example, one may easily extend the equations to arbitrary anisotropy formation cases by evaluating the effective formation shear modulus as seen below:

$$\frac{1}{\mu_{fm}} = \frac{1}{p_b A_b} \int_{C_b} u_n ds', \quad (4)$$

where $A_b$ and $C_b$ represent the area and circumference of the borehole section, respectively, and $u_n$ represents the normal fluid displacement pointing away from the fluid column.

A quasi-static Stoneley slowness log may be produced from the information and characteristics from borehole 124. The quasi-static Stoneley slowness log may comprise, measurements of quasi-static Stoneley slowness at different depths within borehole 123. In some embodiments, the expression for quasi-static Stoneley slowness may have no dependence on the size of borehole 124, which may accurately model the quasi-static Stoneley slowness and/or invert shear modulus of formation 206 from quasi-static Stoneley slowness. Furthermore, this quasi-static Stoneley wave slowness has no dependence on parameters of formation 206 except for the effective formation shear modulus $\mu_{fm}$. Thus, the shear modulus of formation 206 may be solved for from Equation (1) and/or (2) without making any assumption about features and/or properties of formation 206.

Figure 3:
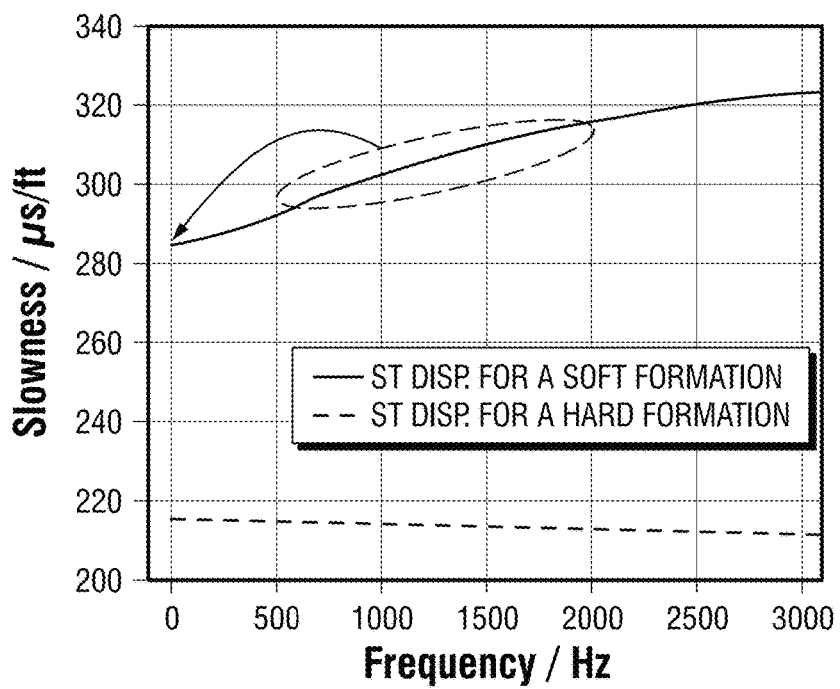
FIG. 3 is a graph illustrating a Stoneley dispersion response.

As stated above, the quasi-static Stoneley wave slowness (zero-frequency Stoneley wave slowness) may comprise accurate information of the shear modulus in the horizontal direction. However, it may not be possible to directly measure the quasi-static Stoneley wave due to the limitation of the transmitted frequency from downhole tool 102 and the influence of waves produced by downhole tool 102 at a very-low frequency band. It may not be possible either to excite and/or capture zero-frequency Stoneley waves with current downhole tools and 0.5 kHz may not be low enough to replace the zero-frequency Stoneley wave slowness. FIG. 3 is a graph illustrating the Stoneley dispersion responses for a typical fast formation and a typical slow formation, respectively. The Stoneley slowness between 0.5~2 kHz may still be different from the zero-frequency Stoneley wave slowness, which may be more profound when formation 206 may be "soft," which may be described as a formation referring to its shear slowness larger than borehole fluid slowness. This may lead to larger error if one takes the low-frequency (0.5~2 kHz) Stoneley wave slowness as the quasi-static Stoneley wave slowness in Stoneley data processing. It may be difficult to use Equation (1) to obtain a shear modulus of formation 206 as the zero-frequency Stoneley wave slowness may not be directly obtained by any downhole tools.

The graph in FIG. 3 may be an example of building an advanced and data-driven method to predict the quasi-static Stoneley wave slowness from the Stoneley wave data for a typical well at frequencies between 0.5 and 2.0 kHz. The method may be flexible and reliable, and it may be adapted to complicated conditions in borehole 124 without special assumption of borehole 124 and formation 206. The estimated quasi-static Stoneley wave slowness may then be utilized to calculate effective shear modulus of formation 206, and may further combine with dipole measurements, which may produce the Stoneley observed anisotropy for any types of formation 206.

Figure 4:
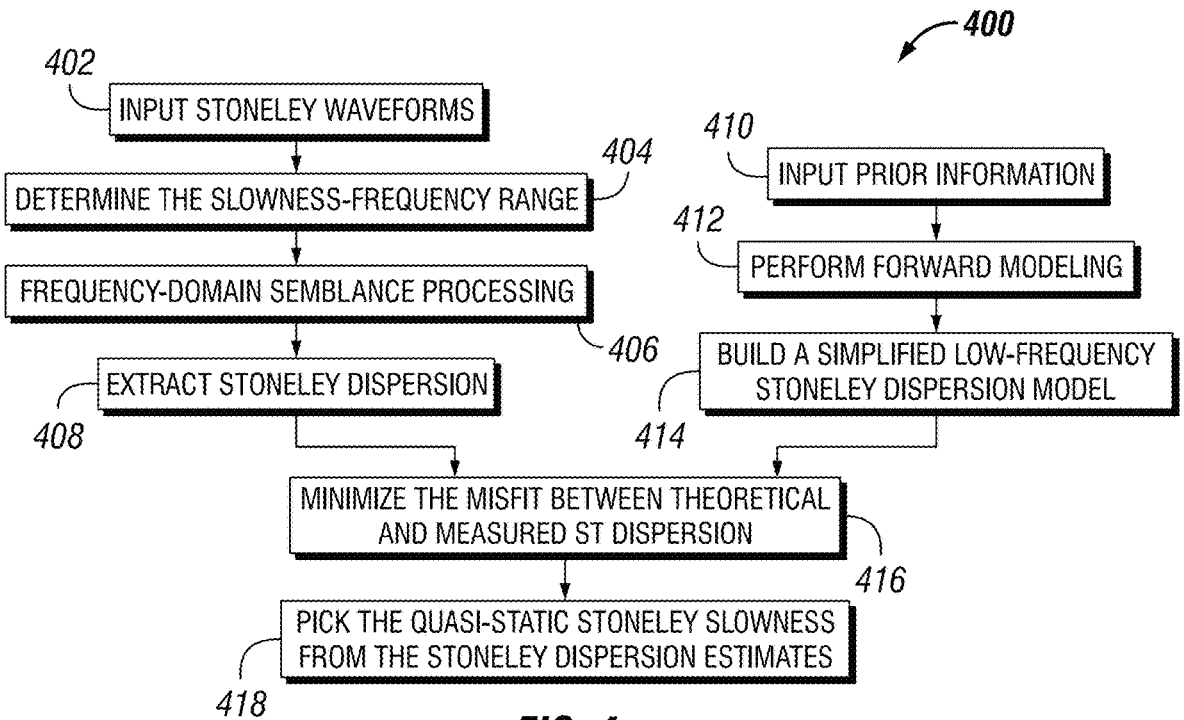
FIG. 4 is a work-flow chart for frequency-domain processing and time domain processing.

To extract the quasi-static Stoneley wave slowness, an operator may choose a frequency-domain based approach and/or a time-domain based method. As illustrated in FIG. 4, a work flow 400 for frequency-domain processing and time-domain processing is illustrated. In block 402, the waveforms captured by receives 202 placed equally along the borehole axis may be fed into information handling system 114. In block 404, the slowness-frequency range of the Stoneley modes may be determined by using an automatically slowness-frequency range selection method. In block 406, a frequency-domain semblance processing may be performed and, in block 408, the measured Stoneley dispersion may be extracted by picking the maximum semblance/coherence value at each frequency. During this processing, in block 410 prior information from borehole characteristics may be input (e.g., mud slowness, mud density) into information handling system 114. In block 412 the prior information may be processed to perform a forward simulation of the low-frequency Stoneley wave in a forward model. Low-frequency Stoneley generally refer to Stoneley waves below 2 kHz in Sonic logging data. In block 414, a simplified theoretical low-frequency Stoneley dispersion model may be produced. Theoretical low-frequency Stoneley dispersion model refers to data set that may be calculated by theoretically forward modeling with known parameters. After both the theoretical dispersion model and measured Stoneley dispersion curves may be obtained, in block 416 an optimization procedure to extract the Stoneley dispersion and quasi-static Stoneley wave slowness may be performed. The optimization procedure may be performed by minimizing the misfit between theoretical and measured Stoneley dispersion. In block 418, the quasi-static Stoneley wave slowness is estimated by the zero-frequency slowness value of the predicted Stoneley dispersion.

Figure 5:
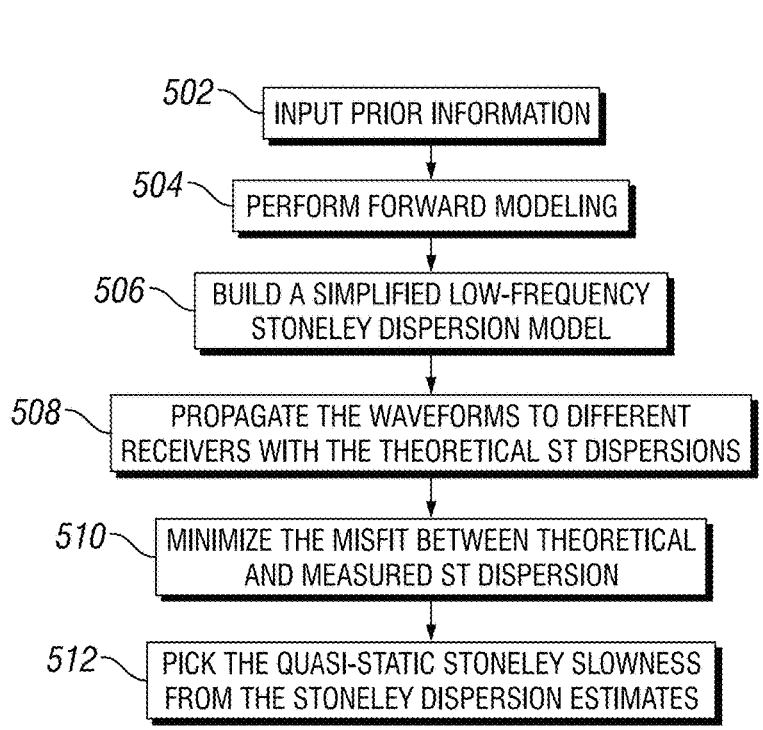
FIG. 5 is a work flow chart for a time-domain based processing.

FIG. 5 illustrates a work flow for a time-domain based processing work flow 500 for estimating quasi-static Stoneley wave slowness from low-frequency Stoneley waveform data. In block 502, a theoretical Stoneley dispersion model may be built with prior information, similar to the work flow 400 in FIG. 4. In block 504, a forward model performed may be utilized, as similar to the frequency domain method 400 in FIG. 4. In block 506, a dispersion model, as similar to the frequency domain method 400 in FIG. 4, may be prepared. In block 508, the waveforms may propagate from a first receiver to additional receiver (e.g. from receiver 202 on FIG. 2) by the dispersion model with trial parameters. In block 510, the trial parameters of the dispersion model may be found by minimizing the misfit between the measured Stoneley waveform data and the predicated Stoneley waveform data, by maximizing the coherence value between the measured and predicated Stoneley waveform data, and/or by maximizing the energy of the stacked waveform of all the predicated and measured Stoneley waveform data. In block 512, the Stoneley dispersion estimates may be obtained once the trail parameters may be optimized. An operator may pick the quasi-static Stoneley wave slowness from the estimated Stoneley dispersion at zero-frequency.

As shown in FIGS. 4 and 5, a procedure in the work flows may include constructions of the theoretical Stoneley dispersion model. In examples, a Stoneley model that accounts for all the types of formation 206, fluid in borehole 124 (e.g., fluid 208 on FIG. 2), and/or factors from downhole tool 102 may be complicated, and therefore, it may be unlikely to introduce a complicated Stoneley dispersion model for practical field data processing. Introducing a forward model into the work flows of FIG. 3 and FIG. 4 may allow an operator to fully utilize the known information from other logs.

In examples, the Stoneley dispersion may be solved by the dispersion equation and/or characteristic equation with a numerical method, $$M_{ST}(f,R,DTM,\rho_{mud},DTC,DTS,\rho_{fm},ANI,INV,TL)=0, \quad (5)$$

where f represents frequency, R denotes the borehole radius, $\rho_{mud}$ and $\rho_{fm}$ denote the mass density of mud and formation respectively; DTS and DTC denote formation shear and compressional wave slowness; DTM represents mud slowness; ANI represents all the anisotropy parameters of the formation; INV denotes all the invasion parameters; TL denotes the parameters of the tool model. Solving Equation (5) with a numerical method, the Stoneley dispersion model may be written as seen below.

$$D_{ST}(f,R,DTM,\rho_{mud},DTC,DTS,\rho_{fm},ANI,INV,TL), \quad (6)$$

Equation (6) may comprise many parameters which may increase the amount of time in which to process Equation (6). Thus, a simplified Stoneley dispersion model may be utilized in place of Equation (6) to decrease processing time. The simplified Stoneley dispersion model may be written as seen below:

$$D_{ST}(f,R,DTM,\rho_{mud},DTC,\rho_{fm},s_{feature},a,b,TL), \quad (7)$$

Equation (6). For example, in an extreme case, the combination of ($s_{feature}$,a,b) may compensate for the influences of all the parameters in Equation (6) except for the DTM, which may create a new equation below:

$$D_{ST}(f,DTM,s_{feature},a,b)=bD_{ST}(af,DTM,s_{feature},1,1)+ (1-b)s_{feature}, \quad (9)$$

although this simplification may reduce the accuracy of the model. Note that in Equation (9) the fundamental library may be generated by a set of standard parameters of field data. Also note that the feature point ($s_{feature}$,$f_{feature}$) of Stoneley dispersion may be selected on the dispersion curves according to the accuracy of downhole tool 102.

The introduction of adjustable parameter a and b may make the processing independent of the model assumption on formation anisotropy and invasion. Additionally, the adjustable parameter a and b may be optimized by using the measured Stoneley dispersion data.

Figure 6:
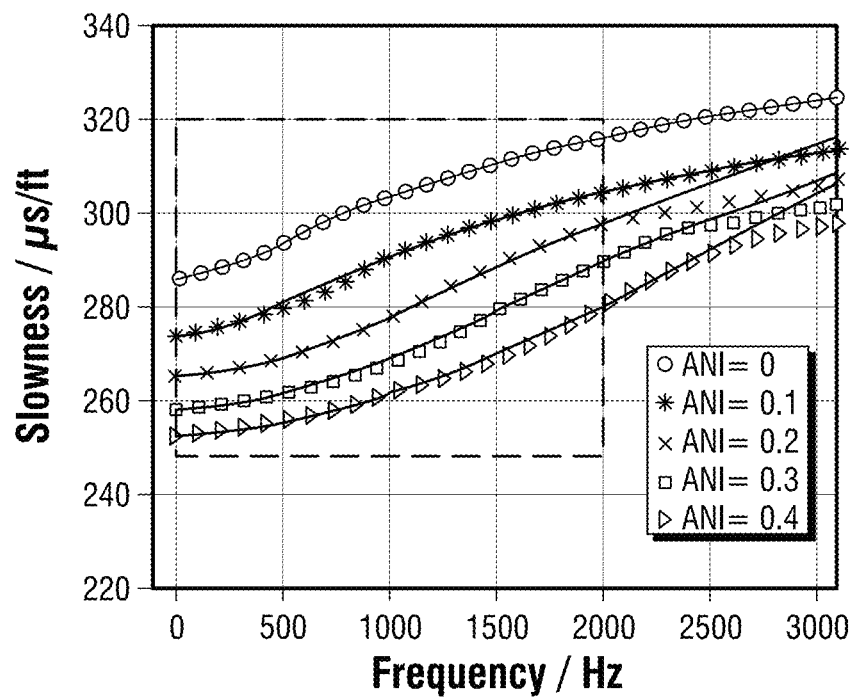
FIG. 6 is a graph illustrating the comparison between the exact Stoneley dispersions by forward modeling and the dispersion curves from the simplified Stoneley model.

FIG. 6 displays a comparison between the exact Stoneley dispersions by forward modeling (solid line) and the dispersion curves from the simplified Stoneley model (scatters). Cases with the formations having different degree level of anisotropy may be shown to reflect the accuracy of the model for formations at different anisotropy level. As shown in FIG. 6, at frequencies below 2 kHz the simplified model fits the exact model well, while the simplified model differs from the exact model at frequencies above 2 kHz. This may suggest that the simplified dispersion model may be accurate for low-frequency (<2 kHz) Stoneley waves. Moreover, the proposed method of this disclosure may process the low-frequency Stoneley signals; therefore this simplified Stoneley dispersion model may make the inversion purpose more accurate.

The simplified dispersion model and the Stoneley dispersion curve may be optimized to obtain the parameters ($s_{feature}$,a,b) in Equation (8) by minimizing the misfit between estimated Stoneley data and measured Stoneley data. For example, the objective function of optimization in the frequency-domain based method may be written as seen below:

$$O(s_{feature}, a, b) = \sum_{f} |D_{ST}^{model}(f, R, DTM, \rho_{mud}, DTC, \rho_{fm}, s_{feature}, a, b, TL) - D_{ST}^{measure}(f)|^2 \quad (10)$$

where $s_{feature}$ denotes a feature point in the dispersion curve at a specific frequency point $f_{feature}$, a and b are newly introduced parameters that may account for the effect of anisotropy and invasion. In the simplified Stoneley dispersion model of Equation (7), ($s_{feature}$,a,b) may replace the parameters (DTS, ANI, INV) in Equation (6). This simplified Stoneley dispersion model may be obtained from a Stoneley dispersion model for surrounding of borehole 124 by a formation 206 which may be isotropic without mud invasion described in Equation (8) below:

$$D_{ST}(f,R,DTM,\rho_{mud},DTC,\rho_{fm},s_{feature},a,b,TL)= bD_{ST}(af,R,DTM,\rho_{mud},DTC,\rho_{fm},s_{feature},1,1,TL)+ (1-b)s_{feature}, \quad (8)$$

Note that the basic dispersion library $D_{ST}$(af,R,DTM,$\rho_{mud}$,DTC,$\rho_{fm}$,$s_{feature}$,1,1,TL) may be generated with a set of parameters for in cases in which formation 206 may be without anisotropy and mud invasion. For practical application, it may be possible to further decrease the amount of forward modeling parameters. The combination of ($s_{feature}$, a,b) may compensate the influence of more parameters in where the parameters that minimize the objective function $O(s_{feature}$,a,b) may be utilized in later Equations. Optimization and/or inversion methods may be used. Once the optimum parameters ($s_{feature}$,a,b) may be obtained, an operator may compute the estimated dispersion with Equation (8), and the quasi-static Stoneley slowness may be picked at the zero-frequency from the estimated dispersion curve.

Figure 7:
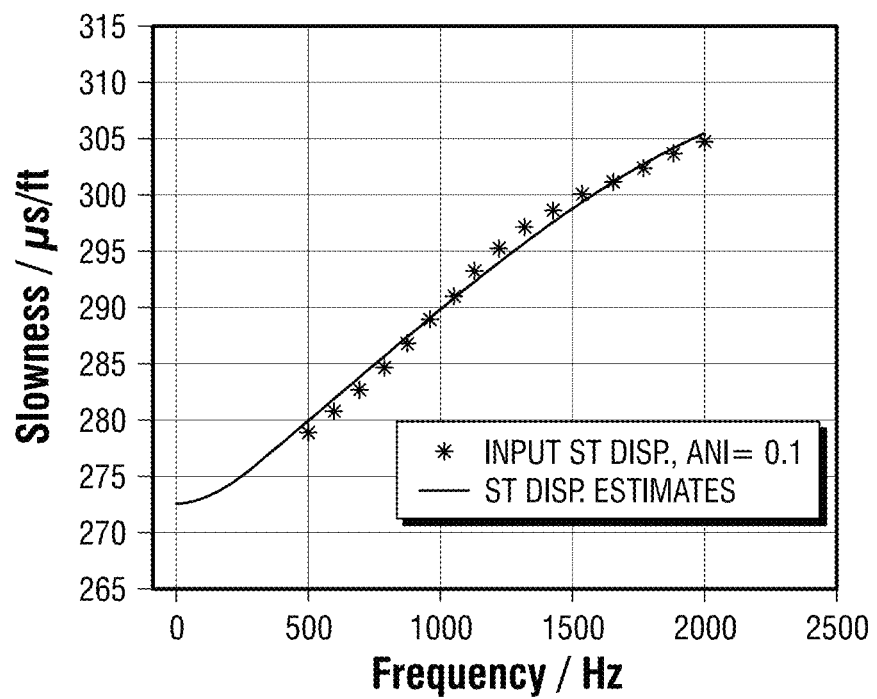
FIG. 7 is a graph illustrating the difference between the input Stoneley data and the final Stoneley dispersion estimates.
Figure 8:
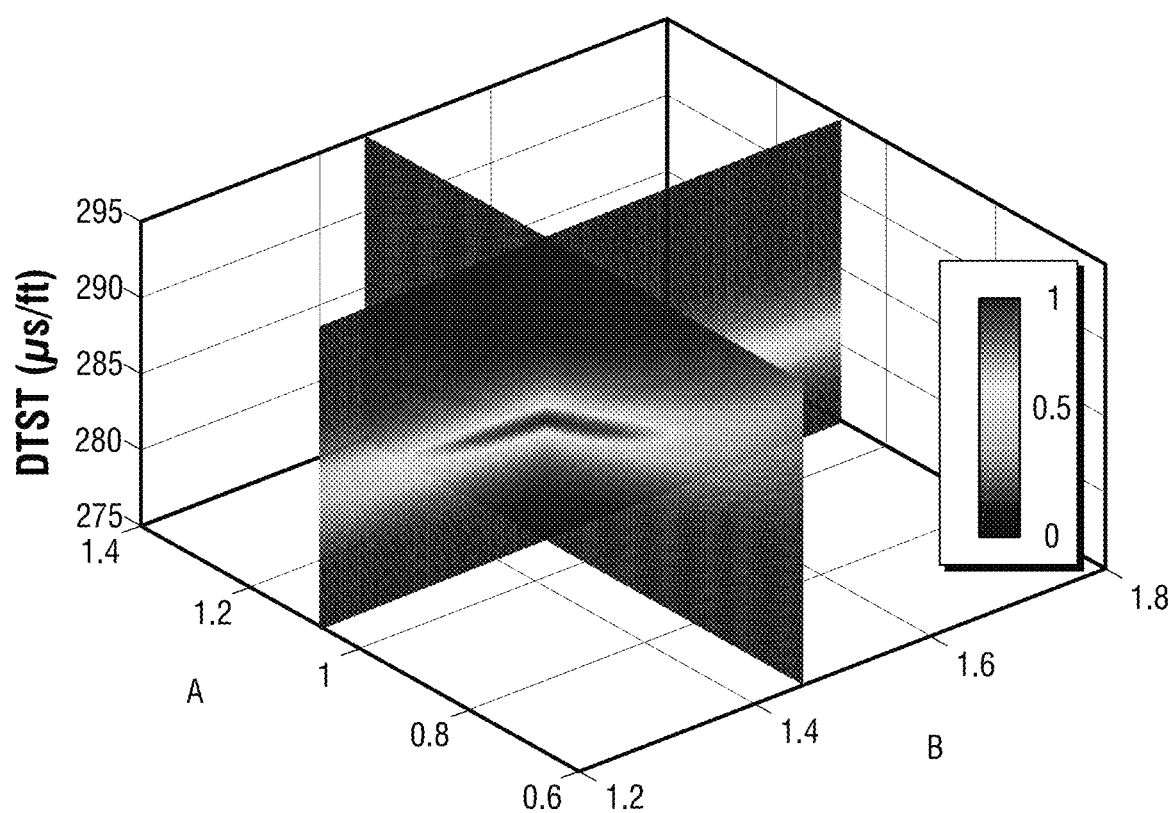
FIG. 8 illustrates a sliced map of the objective function.

In an example, the optimization procedure for Stoneley dispersion estimating in the frequency domain, the synthetic data for formation 206 with anisotropy level of 0.1 as the input dispersion data may be used. The selected working frequency band may be 0.5~2 kHz with downhole tool 102. The processing results, illustrated in FIG. 7, where FIG. 7 shows a comparison between the input Stoneley data and final Stoneley dispersion estimates, and FIG. 8 shows the sliced map of the objective function. The comparison shows that the estimate Stoneley dispersion well matches the input Stoneley data, and the estimated quasi-static Stoneley slowness is 272.27 μs/ft, may be close to input quasi-static Stoneley slowness of 273.34 µs/ft. In examples, an inversion error is 0.38% may be acceptable for acoustic logging data processing.

A visualization of the inverted results may be produced with the objective function values. The objective function may first be normalized as seen below:

$$\text{Img}(s_{feature}, a, b) = \frac{O_{min}}{O(s_{feature}, a, b)}, \quad (11)$$

where $O_{min}$ denotes the global minimum of the objective function, and a sliced figure may display the function value of interest with color. Note that Equation (11) normalized the value of Img to be between 0 and 1, where the higher the Img values, the closer to the optimized answer the data may be. This display method may be considered to be a qualitative method for monitoring the optimization process and the correctness of the estimations. Note that, in FIG. 8, the object function image shows a single clear peak with smoothed edge, suggesting objective function may not be ill-conditioned and therefore, the inversion may be stable and reliable.

Figure 9:
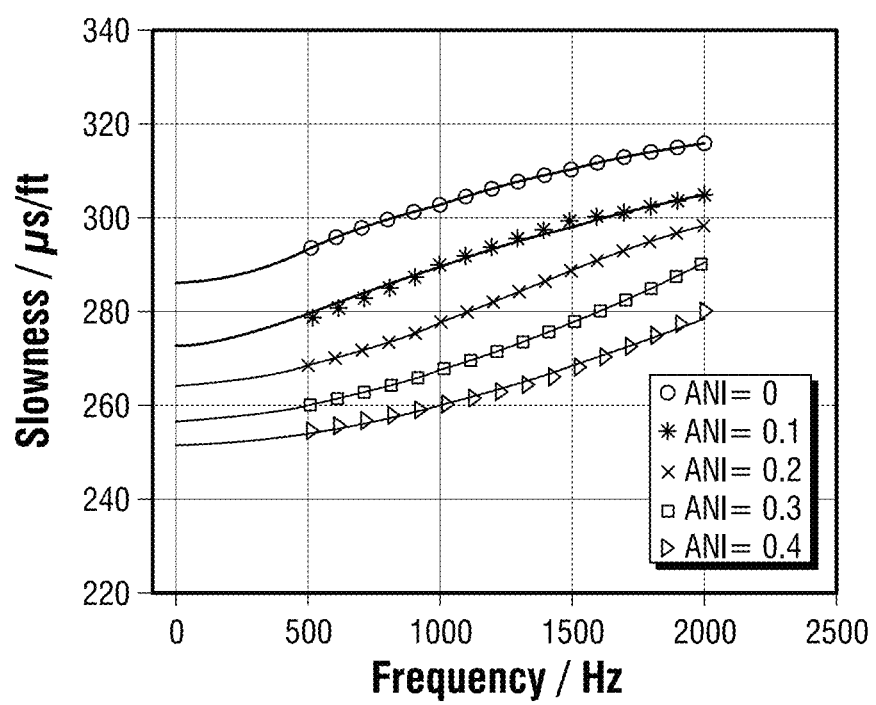
FIG. 9 is a graph showing different anisotropy levels.

Several examples at different anisotropy levels are shown in FIG. 9. The synthetic Stoneley data between 0.5 kHz and 2 kHz may be processed to reach the quasi-static Stoneley wave slowness. FIG. 9 suggests that the estimated Stoneley dispersions may be equal with the input Stoneley data and the average error for quasi-static Stoneley wave slowness estimating is 0.192%. Processing synthetic data suggests that the simplified Stoneley dispersion model may be accurate and the new method may provide accurate quasi-static Stoneley wave slowness.

Figure 10A:
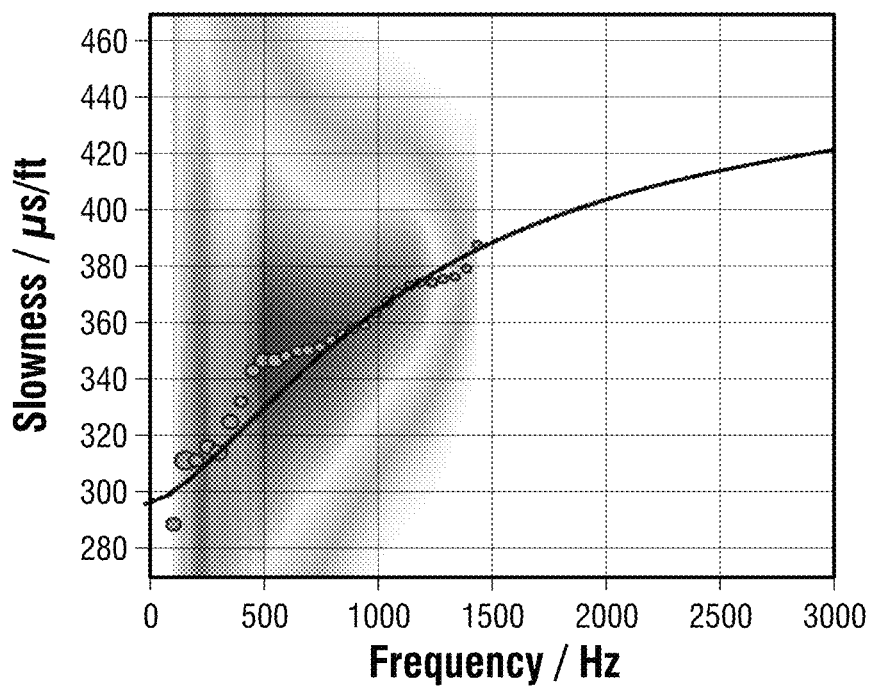
FIG. 10a illustrates a first low-frequency monopole firing.
Figure 10B:
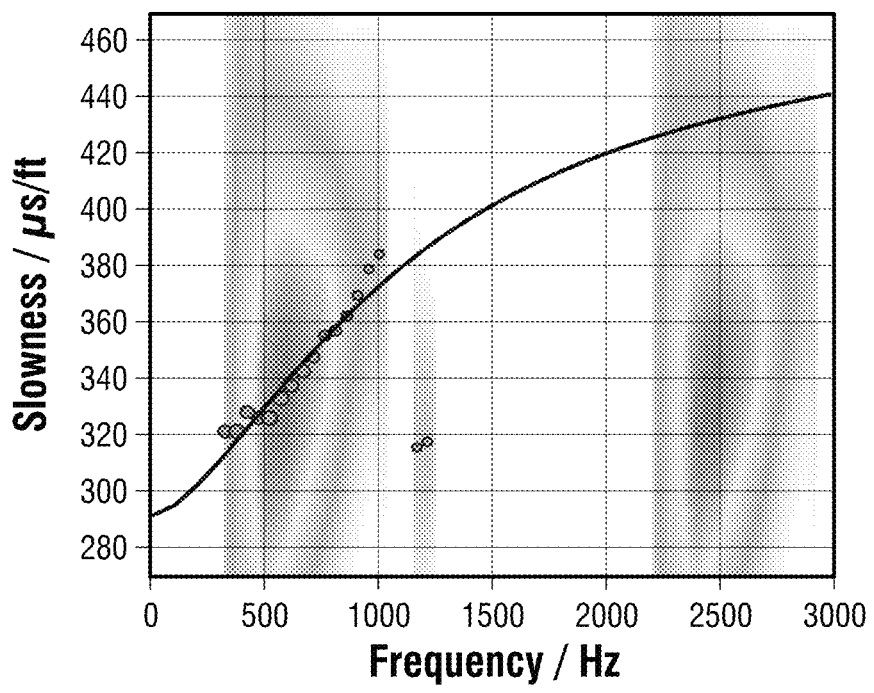
FIG. 10b illustrates a second low-frequency monopole firing.

FIGS. 10a and 10b illustrate two low-frequency monopole firings of adjacent depths. It may be noted that the two firing may be very close in depth; the quasi-static Stoneley wave slowness may be close, due to the fact that the sonic data may actually contribute an average of the formation section around receivers 202. The Stoneley data in FIG. 10a illustrates high quality of frequencies down to 0.15 kHz, while the Stoneley data in FIG. 10b may read only to 0.4 kHz. For both FIGS. 10a and 10b, the estimated Stoneley dispersions fit with the measured Stoneley dispersions, and the estimated quasi-static Stoneley slowness for the two cases may be close to each other, suggesting that the Stoneley dispersions and quasi-static slowness may be both correctly estimated.

Figure 11:
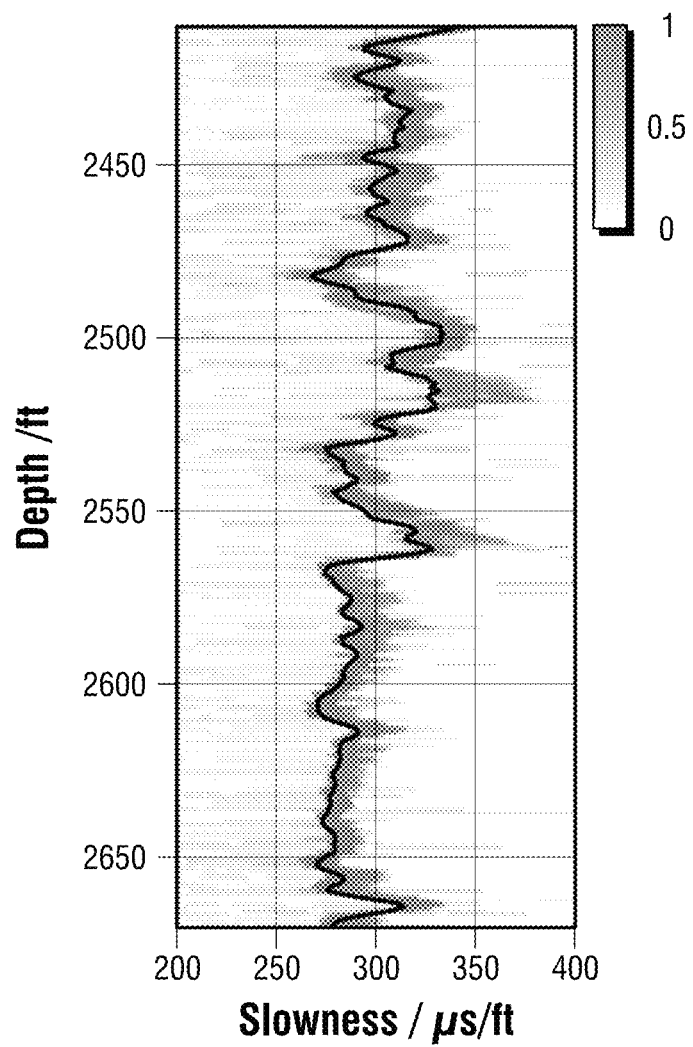
FIG. 11 is an example of field data processing for a soft formation case in a log-form.

FIG. 11 illustrates an example of field data processing for a soft formation case in a log-form. The quasi-static Stoneley wave slowness may be overlaid on the VDL of normalized slowness density log (NSDL) that shows the intensity of dispersion curves at each slowness grid. In examples, Stoneley modes may be dispersive positively for soft formation cases, the estimated quasi-static Stoneley slowness may be overlaid at the leading edge of the first local maximum on the VDL. The Stoneley estimates in FIG. 11 may agree with the leading edge of first local maximum, which may suggests that the quasi-static Stoneley waves may be well evaluated.

Figure 12:
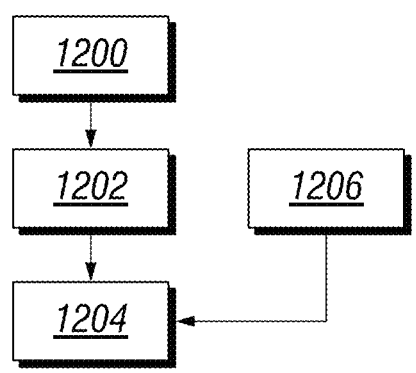
FIG. 12 is a work flow for the formation shear slowness and shear slowness anisotropy calculations.

In examples, after the quasi-static Stoneley wave slowness may be extracted, the formation shear slowness and shear slowness anisotropy may be calculated by the work flow illustrated in FIG. 12. In block 1200, quasi-static Stoneley slowness may be obtained as discussed above. In block 1202, the effective Stoneley effective formation shear modulus $\mu_{ST}$ may be obtained by the Equation below:

$$\mu_{ST} = \frac{1}{\frac{(s_{ST}^{static^2} - DTM^2)(1-r_{tool})}{\rho_{mud}} - \frac{r_{tool}}{\mu_{tool}}}, \quad (12)$$

without limitation, the Stoneley observed anisotropy may be obtained by, $$\xi = \frac{\mu_{ST} - \mu_{qSV}}{2\mu_{qSV}}, \quad (13)$$

where $\xi$ represents Stoneley observed anisotropy, $\mu_{qSVq}$ represent shear modulus calculated, block 1204, from the formation density and vertically propagating shear wave (SV) or quasi Vertically propagating shear wave (quasi-SV) slowness from dipole data processing, $$\mu_{qSV} = \frac{\rho_{fin}}{s_{qSV}^2}, \quad (14)$$

Herein, $\xi$ represents the apparent formation shear anisotropy observed by Stoneley waves. Specifically, for a case of a VTI formation in a vertical well, $\xi$ may be the final shear slowness anisotropy. In block 1206, shear slowness for the case of a VTI and/or tilted transversely isotropic (TI) formation in a deviated and/or vertical well combined with the processing results of cross-dipole data if one knows the angle θ between the Transversely Isotropic (TI) symmetric axis and the borehole axis by using Equation (15):

$$\lambda = \frac{\eta\left(\frac{\sin^2\theta}{8} - \cos^2\theta\right) + \xi\cos^2\theta}{(1+2\eta)\cos^4\theta - (1+2\xi)\cos^2\theta\sin^2\theta + \frac{\sin^4\theta}{8}}, \quad (15)$$

where, λ denotes the true shear slowness anisotropy of the rock formation, η is the apparent shear slowness anisotropy obtained from dipole processing. Without limitation:

$$\eta = \frac{\mu_{SH} - \mu_{qSV}}{2\mu_{qSV}}, \quad (16)$$

where $\mu_{SH}$ represent the shear modulus in the borehole axis.

Additionally, note that Equation (16) is simplified to be λ=ξ when θ=0°, and λ=η when θ=90°, which is consistent with the physics behind the measurements.

This systems and methods may include any of the various features of the compositions, methods, and system disclosed herein, including one or more of the following statements.

Statement 1: A method for producing a Quasi-Static Stoneley Slowness log comprising: recording a pressure wave at a receiver; determining a slowness-frequency range with an information handling system from the pressure wave; processing a frequency-domain semblance; extracting a Stoneley Dispersion; minimizing a misfit between theoretical and the Stoneley Dispersion; and identifying Quasi-Static Stoneley slowness from the Stoneley Dispersion.

Statement 2: The method of statement 1, further comprising: finding borehole characteristics; performing a forward model with borehole characteristics; and building a low-frequency Stoneley Dispersion Model.

Statement 3: The method of statement 2 or statement 1, wherein the borehole characteristics comprises mud slowness or mud density.

Statement 4: The method of any preceding statement, wherein the low-frequency Stoneley Dispersion Model is created from $D_{ST}(f,R,DTM,\rho_{mud},DTC,DTS,\rho_{fm},ANI,INV,TL)$, where f is frequency, R is borehole radius, $\rho_{mud}$ is mass density of mud, $\rho_{fm}$ is formation respectively; DTS is formation shear, DTC is compressional wave slowness, DTM is mud slowness, ANI are anisotropy parameters of the formation, INV are invasion parameters, and TL are parameters of a tool model.

Statement 5: The method of any preceding statement, wherein the extracting the Stoneley Dispersion comprises identifying a maximum semblance/coherence value at a frequency.

Statement 6: The method of any preceding statement, wherein the minimizing a misfit between theoretical and the Stoneley Dispersion comprises comparing the extracted Stoneley Dispersion to the low-frequency Stoneley Dispersion Model.

Statement 7: The method of any preceding statement, further comprising displaying the Quasi-Static Slowness in a log.

Statement 8: A method for producing an Quasi-Static Stoneley Slowness log comprising: recording a pressure wave at a first receiver; inputting borehole characteristics into an information handling system; performing a forward model with the information handling system; building a low-frequency Stoneley Dispersion Model; propagating a waveform to a second receiver; minimizing a misfit between predicted and measured Stoneley waveform data to estimate final Stoneley dispersion; and identifying Quasi-Static Stoneley Slowness from the estimate final Stoneley dispersion.

Statement 9: The method of statement 8, wherein the borehole characteristics comprises mud slowness or mud density.

Statement 10: The method of statement 8 or statement 9, wherein the building a low-frequency Stoneley Dispersion Model is created from $D_{ST}(f,R,DTM,\rho_{mud},DTC,\rho_{fm},s_{feature},a,b,TL)$ where f is frequency, R is borehole radius, $\rho_{mud}$ is mass density of mud, $\rho_{fm}$ is formation respectively; DTS is formation shear, DTC is compressional wave slowness, DTM is mud slowness, ANI are anisotropy parameters of the formation, INV are invasion parameters, and TL are parameters of a tool model, $s_{feature}$ is a feature point in a dispersion curve at a specific frequency point, a and b are parameters that account for the effect of anisotropy and invasion.

Statement 11: The method of any preceding statement, wherein the propagating a waveform to a second receiver is done with at least one trial parameter.

Statement 12: The method of any preceding statement, wherein the minimizing the misfit between predicted and measured Stoneley waveform data comprises maximizing a coherence value between the predicted and measured Stoneley waveform data.

Statement 13: The method of any preceding statement, wherein the minimizing the misfit between predicted and measured Stoneley waveform data comprises maximizing the energy of a stacked waveform of the predicted and measured Stoneley waveform data.

Statement 14: The method of any preceding statement, comprising displaying the Quasi-Static Stoneley Slowness on a log.

Statement 15: A well measurement system for producing an Quasi-Static Stoneley Slowness log and shear slowness anisotropy for a vertically transversely isotropic formation comprising: a downhole tool; a vehicle, wherein the downhole tool is attached by a conveyance to the downhole tool; and an information handling system operable to record a pressure wave at a receiver; determine a slowness-frequency range with an information handling system from the pressure wave; process a frequency-domain semblance; extract a Stoneley Dispersion; minimize a misfit between theoretical and the Stoneley Dispersion; and identify Quasi-Static Stoneley slowness from the Stoneley Dispersion.

Statement 16: The method of statement 15, wherein the information handling system is operable to obtain a formation shear slowness anisotropy for a tilted transversely isotropic formation.

Statement 17: The method of statement 15 or statement 16, wherein the formation density and a layer dip angle is computed from $$\lambda = \frac{\eta\left(\frac{\sin^2\theta}{8} - \cos^2\theta\right) + \xi\cos^2\theta}{(1+2\eta)\cos^4\theta - (1+2\xi)\cos^2\theta\sin^2\theta + \frac{\sin^4\theta}{8}}$$

where $\lambda$ is the true shear slowness anisotropy of the rock formation, $\eta$ is the apparent shear slowness anisotropy obtained from dipole processing, and $\xi$ is the apparent formation shear anisotropy observed by Stoneley waves.

Statement 18: The method of any preceding statement, wherein an apparent shear slowness anisotropy is found with $$\eta = \frac{\mu_{SH} - \mu_{qSV}}{2\mu_{qSV}}$$

where $\eta$ is the apparent shear slowness anisotropy obtained from dipole processing, $\mu_{qSV}$ is shear modulus for vertically polarized shear waves, and $\mu_{SH}$ is the shear modulus for horizontally polarized shear waves propagation in the borehole axis.

Statement 19: The method of any preceding statement, wherein the information handling system is operable to compute a Stoneley Effective formation shear modulus is found with $$\mu_{ST} = \frac{1}{\frac{(s_{ST}^{static^2} - DTM^2)(1 - r_{tool})}{\rho_{mud}} - \frac{r_{tool}}{\mu_{tool}}}.$$

Statement 20: The method of any preceding statement, wherein the information handling system is operable to compute a formation shear anisotropy is found with $$\xi = \frac{\mu_{ST} - \mu_{qSV}}{2\mu_{qSV}}$$

$\xi$ is the apparent formation shear anisotropy observed by Stoneley waves, $\mu_{qSV}$ is shear modulus for vertically polarized shear waves calculated from dipole data processing, and $\mu_{ST}$ is the Stoneley Effective formation shear modulus.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference. the definitions that are consistent with this specification should be adopted.

What is claimed is:

1. A method for producing a Quasi-Static Stoneley Slowness log comprising:
   disposing a downhole tool into a borehole, wherein the downhole tool includes:
      at least one transmitter configured to generate a pressure wave; and
      at least one receiver; configured to record the pressure wave;
   determining a slowness-frequency range with an information handling system,
   processing a frequency-domain semblance from the slowness-frequency range;
   extracting a Stoneley Dispersion from the frequency-domain semblance;
   minimizing a misfit between a theoretical low-frequency Stoneley dispersion model and the Stoneley Dispersion; and
   identifying Quasi-Static Stoneley slowness from the Stoneley Dispersion in real time.

2. The method of claim 1, further comprising:
   finding borehole characteristics;
   performing a forward model with borehole characteristics; and
   building a low-frequency Stoneley Dispersion Model.

3. The method of claim 1, wherein the extracting the Stoneley Dispersion comprises identifying a maximum semblance/coherence value at a frequency.

4. The method of claim 1, further comprising displaying the Quasi-Static Slowness in a log.

5. The method of claim 2, wherein the borehole characteristics comprises mud slowness or mud density.

6. The method of claim 2, wherein the low-frequency Stoneley Dispersion Model is created from $D_{ST}(f,R,DTM,\rho_{mud},DTC,DTS,\rho_{fm},ANI,INV,TL)$, where f is frequency, R is borehole radius, $\rho_{mud}$ is mass density of mud, $\rho_{fm}$ is formation respectively; DTS is formation shear, DTC is compressional wave slowness, DTM is mud slowness, ANI are anisotropy parameters of the formation, INV are invasion parameters, and TL are parameters of a tool model.

7. A method for producing Quasi-Static Stoneley Slowness log comprising:
   disposing a downhole tool into a borehole, wherein the downhole tool includes:
      at least one transmitter configured to generate a pressure wave; and
      at least one receiver; configured to record the pressure wave;
   inputting known borehole characteristics into an information handling system;
   creating a forward model with the information handling system from the known borehole characteristics;
   building a low-frequency Stoneley Dispersion Model;
   minimizing a misfit between a predicted Stoneley waveform and a measured Stoneley waveform to estimate final Stoneley dispersion by maximizing a coherence value between the predicted Stoneley wave form and the measured Stoneley waveform; and
   identifying Quasi-Static Stoneley Slowness from the estimate final Stoneley dispersion in real time.

8. The method of claim 7, wherein the borehole characteristics comprises mud slowness or mud density.

9. The method of claim 8, wherein the building a low-frequency Stoneley Dispersion Model is created from $D_{ST}(f,R,DTM,\rho_{mud},DTC,\rho_{fm},s_{feature},a,b,TL)$ where f is frequency, R is borehole radius, $\rho_{mud}$ is mass density of mud, $\rho_{fm}$ is formation respectively; DTS is formation shear, DTC is compressional wave slowness, DTM is mud slowness, ANI are anisotropy parameters of the formation, INV are invasion parameters, and TL are parameters of a tool model, $s_{feature}$ is a feature point in a dispersion curve at a specific frequency point, a and b are parameters that account for the effect of anisotropy and invasion.

10. The method of claim 7, further comprising propagating a waveform from a first receiver to a second receiver with at least one trial parameter.

11. The method of claim 7, wherein the minimizing the misfit between predicted and measured Stoneley waveform data comprises maximizing a coherence value between the predicted and measured Stoneley waveform data.

12. The method of claim 7, wherein the minimizing the misfit between predicted and measured Stoneley waveform data comprises maximizing the energy of a stacked waveform of the predicted and measured Stoneley waveform data.

13. The method of claim 7, comprising displaying the Quasi-Static Stoneley Slowness on a log.

14. A well measurement system for producing a Quasi-Static Stoneley Slowness log and shear slowness anisotropy for a vertically transversely isotropic formation comprising:
a downhole tool wherein the downhole tool includes:
at least one transmitter configured to generate a pressure wave; and
at least one receiver; configured to record the pressure wave;
a vehicle, wherein the downhole tool is attached by a conveyance to the downhole tool; and
an information handling system operable to determine a slowness-frequency range from the pressure wave; process a frequency-domain semblance from the slowness-frequency range; extract a Stoneley Dispersion from the frequency-domain semblance; minimize a misfit between a theoretical low-frequency Stoneley dispersion model and the Stoneley Dispersion; and identify Quasi-Static Stoneley slowness from the Stoneley Dispersion.

15. The well measurement system of claim 14, wherein the information handling system is operable to obtain a formation shear slowness anisotropy for a tilted transversely isotropic formation.

16. The well measurement system of claim 14, wherein the information handling system is operable to compute a Stoneley Effective formation shear modulus is found with $$\mu_{ST} = \frac{1}{\frac{\left(s_{ST}^{static^2} - DTM^2\right)(1 - r_{tool})}{\rho_{mud}} - \frac{r_{tool}}{\mu_{tool}}}.$$

17. The well measurement system of claim 14, wherein the information handling system is operable to compute a formation shear anisotropy is found with $$\xi = \frac{\mu_{ST} - \mu_{qSV}}{2\mu_{qSV}}$$

$\xi$ is the apparent formation shear anisotropy observed by Stoneley waves, $\mu_{qSV}$ is shear modulus for vertically polarized shear waves calculated from dipole data processing, and $\mu_{ST}$ is the Stoneley Effective formation shear modulus.

18. The well measurement system of claim 15, wherein the formation density and a layer dip angle is computed from $$\lambda = \frac{\eta\left(\frac{\sin^2\theta}{8} - \cos^2\theta\right) + \xi\cos^2\theta}{(1 + 2\eta)\cos^4\theta - (1 + 2\xi)\cos^2\theta\sin^2\theta + \frac{\sin^4\theta}{8}}$$

where $\lambda$ is the true shear slowness anisotropy of the rock formation, $\eta$ is the apparent shear slowness anisotropy obtained from dipole processing, and $\xi$ is the apparent formation shear anisotropy observed by Stoneley waves.

19. The well measurement system of claim 18, wherein an apparent shear slowness anisotropy is found with $$\eta = \frac{\mu_{SH} - \mu_{qSV}}{2\mu_{qSV}}$$

where $\eta$ is the apparent shear slowness anisotropy obtained from dipole processing, $\mu_{qSV}$ is shear modulus for vertically polarized shear waves, and $\mu_{SH}$ is the shear modulus for horizontally polarized shear waves propagation in the borehole axis.

* * * * *